US010919240B2

(12) United States Patent
Rotter et al.

(10) Patent No.: US 10,919,240 B2
(45) Date of Patent: Feb. 16, 2021

(54) SYSTEM AND METHOD FOR PROCESSING COMPOSITE MATERIAL

(71) Applicant: The Boeing Company, Chicago, IL (US)

(72) Inventors: Daniel M. Rotter, Chicago, IL (US); Brad A. Coxon, Chicago, IL (US); Patrick J. Shephard, Chicago, IL (US); Nicholas W. Deyo, Chicago, IL (US); Darren L. Syverson, Chicago, IL (US); Aleksandr A. Khomyak, Chicago, IL (US); Martin P. Fritzgerald, Chicago, IL (US); Erik M. Brazil, Chicago, IL (US); Harrison B. Lockhart, III, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 325 days.

(21) Appl. No.: 15/902,589

(22) Filed: Feb. 22, 2018

(65) Prior Publication Data

US 2019/0255786 A1  Aug. 22, 2019

(51) Int. Cl.
*B29C 70/44* (2006.01)
*B29C 33/46* (2006.01)
*B29C 33/44* (2006.01)
*B29K 307/04* (2006.01)
*B29K 101/10* (2006.01)
*B32B 5/02* (2006.01)
*C08J 5/04* (2006.01)

(52) U.S. Cl.
CPC .............. *B29C 70/44* (2013.01); *B29C 33/44* (2013.01); *B29C 33/46* (2013.01); *B29C 2791/006* (2013.01); *B29K 2101/10* (2013.01); *B29K 2307/04* (2013.01); *B32B 5/02* (2013.01); *B32B 2260/021* (2013.01); *C08J 5/04* (2013.01)

(58) Field of Classification Search
None
See application file for complete search history.

(56) References Cited

U.S. PATENT DOCUMENTS 4,810,444 A * 3/1989 Alberino ............... B29C 43/361
 264/102
7,029,267 B2 * 4/2006 Caron ..................... B29C 43/12
 156/382

(Continued)

*Primary Examiner* — Benjamin A Schiffman
(74) *Attorney, Agent, or Firm* — McDonnell Boehnen Hulbert & Berghoff LLP

(57) ABSTRACT

An example system for processing composite material includes a cure tool, a source of pressurized gas, and a vacuum bag forming an enclosed volume between the cure tool and the vacuum bag. The system further includes composite material positioned on the cure tool within the enclosed volume. The source of pressurized gas is configured to inflate the vacuum bag, thereby moving a portion of the vacuum bag away from the cure tool and the composite material. An example method includes placing composite material onto a cure tool, placing a vacuum bag over the composite material and the cure tool to form an enclosed volume between the cure tool and the vacuum bag, processing the composite material while the composite material is within the enclosed volume, and inflating the vacuum bag to move a portion of the vacuum bag away from the cure tool and the composite material.

20 Claims, 7 Drawing Sheets

(56) References Cited

U.S. PATENT DOCUMENTS

| | | | |
|---|---|---|---|
| 7,334,782 B2* | 2/2008 | Woods | B29C 70/443 264/510 |
| 7,413,694 B2* | 8/2008 | Waldrop, III | B29C 70/443 264/257 |
| 8,623,262 B2* | 1/2014 | Jung | B29C 33/46 264/335 |
| 9,302,433 B2* | 4/2016 | Carlier | B29C 70/44 |
| 2007/0126155 A1* | 6/2007 | Korwin-Edson | B28B 7/346 264/333 |
| 2010/0181017 A1* | 7/2010 | Shinoda | B29C 70/443 156/242 |
| 2013/0241117 A1* | 9/2013 | Lind | B29D 99/0025 264/511 |

* cited by examiner

SYSTEM AND METHOD FOR PROCESSING COMPOSITE MATERIAL

FIELD

The present disclosure generally relates to processing composite material, and more specifically to systems and methods for moving a portion of a vacuum bag away from composite material (e.g., after processing on a cure tool).

BACKGROUND

Composite parts, such as those used for the manufacture of aircraft, can be constructed using various production methods. For example, uncured composite material, such as carbon-fiber reinforced polymer, thermoplastic material, or thermoset material can be placed onto a cure tool having a contoured surface that is configured to shape the composite material during processing (e.g., curing). A vacuum bag can be placed over the cure tool, the composite material, and/or one or more intermediate layers on the composite material (e.g., a release film or a breather layer). The vacuum bag is then typically adhered to the cure tool to form an enclosed volume between the vacuum bag and the cure tool. A pump can be used to remove air, moisture, and/or volatiles from the enclosed volume to help prevent those substances from becoming trapped within the composite material while the composite material is cured inside of an autoclave, for example. After curing, the vacuum bag and any intermediate layers are generally removed from the composite part by hand after allowing the pressure inside the bag to equalize with atmospheric pressure.

This post-cure process can be tedious because the vacuum bag usually clings to the cure tool and/or the cured composite part due to static electricity that builds up during the curing process. In addition, the static electricity buildup can discharge during removal of the vacuum bag, which can cause discomfort for a technician. Furthermore, the technician may be exposed to particulates, volatiles, or vapors that are remnants of the curing process, adding further discomfort. This creates a need for systems and methods that make removing the vacuum bag from the cure tool and composite part easier, and help neutralize the static electricity and the impurities present during vacuum bag removal.

SUMMARY

A first example of the disclosure is a system for processing composite material. The system includes a cure tool, a source of pressurized gas, a vacuum bag forming an enclosed volume between the cure tool and the vacuum bag, and composite material positioned on the cure tool within the enclosed volume. The source of pressurized gas is configured to inflate the vacuum bag, thereby moving a portion of the vacuum bag away from the cure tool and the composite material.

A second example of the disclosure is a method for processing composite material. The method includes placing composite material onto a cure tool, placing a vacuum bag over the composite material and the cure tool to form an enclosed volume between the cure tool and the vacuum bag, processing the composite material while the composite material is within the enclosed volume, and inflating the vacuum bag to move a portion of the vacuum bag away from the cure tool and the composite material.

A third example of the disclosure is an apparatus for processing composite material. The apparatus includes a pressure assembly configured to receive pressurized gas from a source of pressurized gas and provide the pressurized gas, at a predetermined pressure, to an enclosed volume formed between a vacuum bag and a cure tool. The apparatus also includes an ionizer configured to receive pressurized gas from the source of pressurized gas, ionize the pressurized gas, and provide the ionized pressurized gas to the enclosed volume. The apparatus also includes a bleed valve configured to release gas from the enclosed volume in response to a gas pressure within the enclosed volume exceeding a threshold, and a gas filter configured to receive gas from the enclosed volume and filter the received gas to remove particulates, volatiles, or vapors from the received gas.

A fourth example of the disclosure is a method for processing composite material. The method includes placing composite material onto a cure tool and placing one or more intermediate layers onto the composite material. The method also includes placing a vacuum bag over the composite material, the one or more intermediate layers, and the cure tool to form an enclosed volume between the cure tool and the vacuum bag. The method also includes evacuating gas from the enclosed volume and, after evacuating the gas, processing the composite material while the composite material is within the enclosed volume. The method also includes inflating the vacuum bag using ionized gas having a gauge pressure within a range of 0 to 10 pounds per square inch (psi) to move a portion of the vacuum bag away from the cure tool, the one or more intermediate layers, and the composite material. The method also includes releasing gas from the enclosed volume after inflating the vacuum bag, filtering the released gas to remove particulates, volatiles, or vapors from the released gas, and removing at least a portion of the inflated vacuum bag from the cure tool and the composite material.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
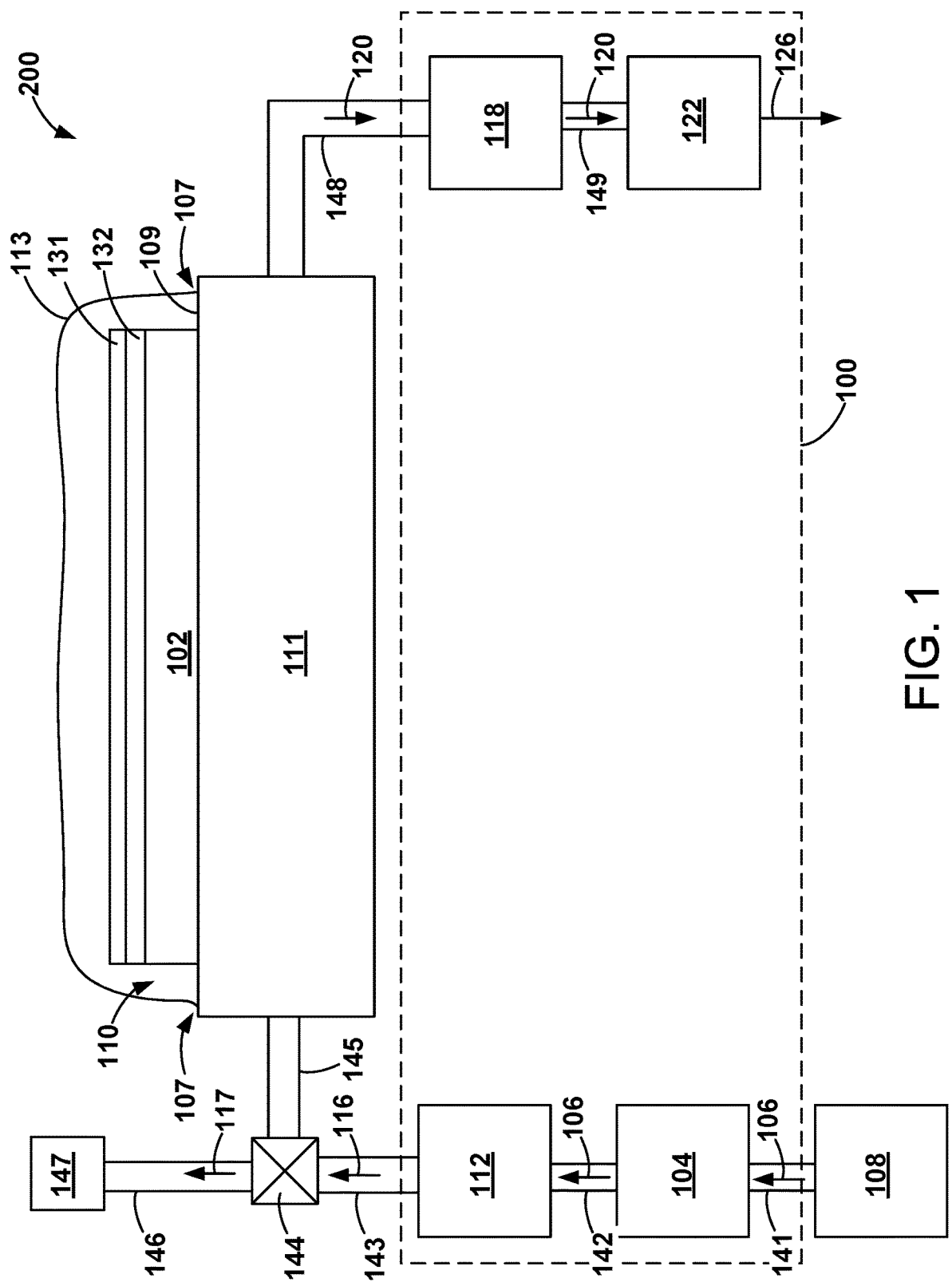
FIG. 1 is a schematic diagram of an apparatus and a system for processing composite material, according to an example embodiment.

As discussed above, there exists a need for systems and methods that make it easier to remove a vacuum bag from a cure tool and a composite part after processing, and/or help neutralize the static electricity and impurities present during vacuum bag removal. Accordingly, such systems and methods are disclosed herein.

Within examples, a system for processing composite material includes a cure tool, a source of pressurized gas (e.g., a pump or a storage tank), a vacuum bag (e.g., plastic, polytetrafluoroethylene, or nylon), and composite material (e.g., a carbon-fiber reinforcement and a thermoset matrix). The cure tool may have a contoured surface configured to shape the composite material into a composite part while curing the composite material inside of an autoclave, for example.

As such, the composite material may be placed onto the cure tool and the vacuum bag may be placed over the composite material and the cure tool to form an enclosed volume between the cure tool and the vacuum bag. Typically, the vacuum bag will be adhered to the cure tool with sealant tape to define a boundary of the enclosed volume that contains the composite material. A pump can be used to remove gas (e.g., air) from the enclosed volume prior to curing the composite material. After the composite material is cured or otherwise processed, the vacuum bag may be inflated by forcing gas into the enclosed volume to move a portion of the vacuum bag away from the cure tool and the composite material. This may make it easier for a technician to grab a portion of the vacuum bag and pull the vacuum bag away from the composite part and the cure tool.

In some embodiments, the system includes a pressure assembly configured to receive pressurized gas from the source of pressurized gas and provide the pressurized gas to the enclosed volume (e.g., at a gauge pressure within a range of 0 to 10 pounds per square inch) for inflating the vacuum bag. Limiting the gas pressure in this way may help prevent damaging hose fittings that connect the source of pressurized air to the cure tool and may help prevent damaging (e.g., "popping") the vacuum bag.

The system may further include an ionizer configured to receive gas from the source of pressurized gas (e.g., via the pressure assembly) and provide ionized gas to the enclosed volume during inflation of the vacuum bag. The ionized gas may neutralize some of the static electricity that builds up within the enclosed volume during processing of the composite material. This may help decrease or eliminate the discomfort experienced by a technician during manual removal of the vacuum bag from the cure tool and the composite material.

The system may further include a bleed valve configured to release gas from the enclosed volume in response to a gas pressure within the enclosed volume exceeding a threshold (e.g., during inflation of the vacuum bag).

The system may further include a gas filter configured to receive gas from the enclosed volume (e.g., from the bleed valve), and filter the received gas to remove particulates, volatiles, or vapors from the received gas. This may help prevent the technician from being exposed to such impurities while removing the vacuum bag from the cure tool and the composite material.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

FIG. 1 is a schematic diagram of a system 200 that includes an apparatus 100.

The apparatus 100 includes a pressure assembly 104 configured to receive pressurized gas 106 from a source 108 of pressurized gas and provide the pressurized gas 106, at a predetermined pressure (e.g., at a gauge pressure within a range of 0 to 10 pounds per square inch), to an enclosed volume 110 formed between a vacuum bag 113 and a cure tool 111. The apparatus 100 also includes an ionizer 112 configured to receive the pressurized gas 106 from the source 108 of pressurized gas (e.g., via the pressure assembly 104), ionize the pressurized gas 106, and provide ionized gas 116 to the enclosed volume 110. The apparatus 100 also includes a bleed valve 118 configured to release gas 120 from the enclosed volume 110 in response to a gas pressure within the enclosed volume 110 exceeding a threshold (e.g., 0 to 10 pounds per square inch). The apparatus 100 also includes a gas filter 122 configured to receive the gas 120 from the enclosed volume 110 (as released by the bleed valve 118) and filter the received gas 120 to remove particulates, volatiles, or vapors from the received gas 120.

Accordingly, the system 200 includes the cure tool 111, the source 108 of pressurized gas, the vacuum bag 113 forming the enclosed volume 110 between the cure tool 111 and the vacuum bag 113, and a composite material 102 positioned on the cure tool 111 within the enclosed volume 110. The source 108 of pressurized gas is configured to inflate the vacuum bag 113, thereby moving a portion 115 of the vacuum bag 113 away from the cure tool 111 and the composite material 102 (see FIG. 6 and accompanying description below).

The source 108 of pressurized gas may include one or more of a pump or a storage tank. The source 108 of pressurized gas is in fluid communication with the pressure assembly 104 via a connection 141 (e.g., hose, piping, or conduit).

The pressure assembly 104 may include a pressure regulator, that is, a device configured to receive gas (e.g., air) at a particular pressure and provide gas at a predetermined pressure that is lower than the particular pressure. The predetermined pressure may correspond to a dial setting or may similarly be selectable via input received via a user interface of the pressure regulator. The pressure regulator may include a restrictor element, a loading element, and a measuring element. Additionally or alternatively, the pressure assembly 104 may include a pressure limiter that is configured to receive gas (e.g., air) at a particular pressure and provide gas at a predetermined pressure that is lower than the particular pressure. The predetermined pressure of gas provided by the pressure limiter may be determined by the structure of pressure limiter and not determined by user input, however the pressure limiter may also include a restrictor element, a loading element, and a measuring element. The pressure assembly 104 is configured to receive the pressurized gas 106 from the source 108 of pressurized gas and provide the pressurized gas 106 to the enclosed volume 110 (e.g., via the ionizer 112). The pressure assembly 104 may provide the pressurized gas 106 at a gauge pressure within a range of 0 to 10 pounds per square inch, for example. The pressure assembly 104 is in fluid communication with the ionizer 112 via a connection 142 (e.g., hose, piping, or conduit).

The ionizer 112 may include an electrically charged electrode configured to introduce electric charges into air that passes through the ionizer 112 when the ionizer 112 is coupled to an electrical power source (e.g., 120 volt AC). The ionizer 112 may take the form of an inline ionizer and is configured to receive pressurized gas 106 from the source 108 of pressurized gas (e.g., via the pressure assembly 104) and provide ionized gas 116 to the enclosed volume 110 (e.g., via a valve 144). That is, the ionizer 112 may be configured to introduce electrically charged particles into the pressurized gas 106 to produce the ionized gas 116. As the ionized gas 116 travels into the enclosed volume 110, the electrically charged particles of the ionized gas 116 may neutralize other electrically charged particles present within the enclosed volume 110. The ionizer 112 is in fluid communication with the valve 144 via a connection 143 (e.g., hose, piping, or conduit).

The valve 144 is operable to alternatively connect either the ionizer 112 or a pump 147 to the cure tool 111, and thus, to the enclosed volume 110. When the valve 144 is operated to connect the pump 147 to the cure tool 111, the pump 147 is configured to evacuate gas 117 (e.g., air) from the enclosed volume 110. The pump 147 is in fluid communication with the valve 144 via a connection 146 (e.g., hose, piping, or conduit).

The cure tool 111 may take the form of a platform having a contoured surface 109 configured to shape the composite material 102 during curing or other processing. A specific shape of the contoured surface is not shown in the Figures, however, the contoured surface 109 may have any shape suitable for forming a composite aircraft component, for example. The cure tool 111 may include internal piping and outlets (not shown) that fluidly connect a connection 145 to the enclosed volume 110.

As shown in FIG. 1, the composite material 102 is positioned on the contoured surface 109 of the cure tool 111. The composite material 102 may include a fiber reinforcement and a polymer matrix. The fiber reinforcement may include a carbon-fiber reinforcement or glass fiber reinforcement. The polymer matrix may include a thermoplastic material or a thermoset material. The composite material may also include a honeycomb structure, but other examples or combinations are possible.

FIG. 1 also shows an intermediate layer 132 (e.g., a release film) positioned on the composite material 102 and an intermediate layer 131 (e.g., a breather layer) positioned on the intermediate layer 132. The intermediate layer 131 and the intermediate layer 132 may protect the composite material 102 yet allow moisture and impurities to pass through during processing or curing.

The vacuum bag 113 may include one or more of plastic, polytetrafluoroethylene, or nylon. The vacuum bag 113 generally functions by forming the enclosed volume 110 so that gas (e.g., air) and impurities can be removed from the enclosed volume 110 with the pump 147 during processing. The vacuum bag 113 is typically adhered to the cure tool 111 with an sealant tape 107 along an outer edge of the cure tool 111.

The bleed valve 118 is in fluid communication with the cure tool 111 (e.g., the enclosed volume 110) via a connection 148 (e.g., hose, piping, or conduit). The cure tool 111 may include internal piping and outlets (not shown) that fluidly connect the connection 148 to the enclosed volume 110. The bleed valve 118 is in fluid communication with the gas filter 122 via a connection 149 (e.g., hose, piping, or conduit). The bleed valve 118 is configured to release gas 120 from the enclosed volume 110 in response to a gas pressure within the enclosed volume 110 exceeding a threshold.

The gas filter 122 (e.g., a carbon adsorption filter) is configured to receive gas 120 from the enclosed volume 110 (e.g., via the bleed valve 118) and filter the received gas 120 to remove particulates, volatiles, or vapors from the received gas 120. Thus, the gas filter 122 may be configured to release the filtered gas in the form of exhaust gas 126. The gas filter 122 may include a carbon substrate that traps particulates, volatiles, or vapors as gas passes through the substrate.

Figure 2:
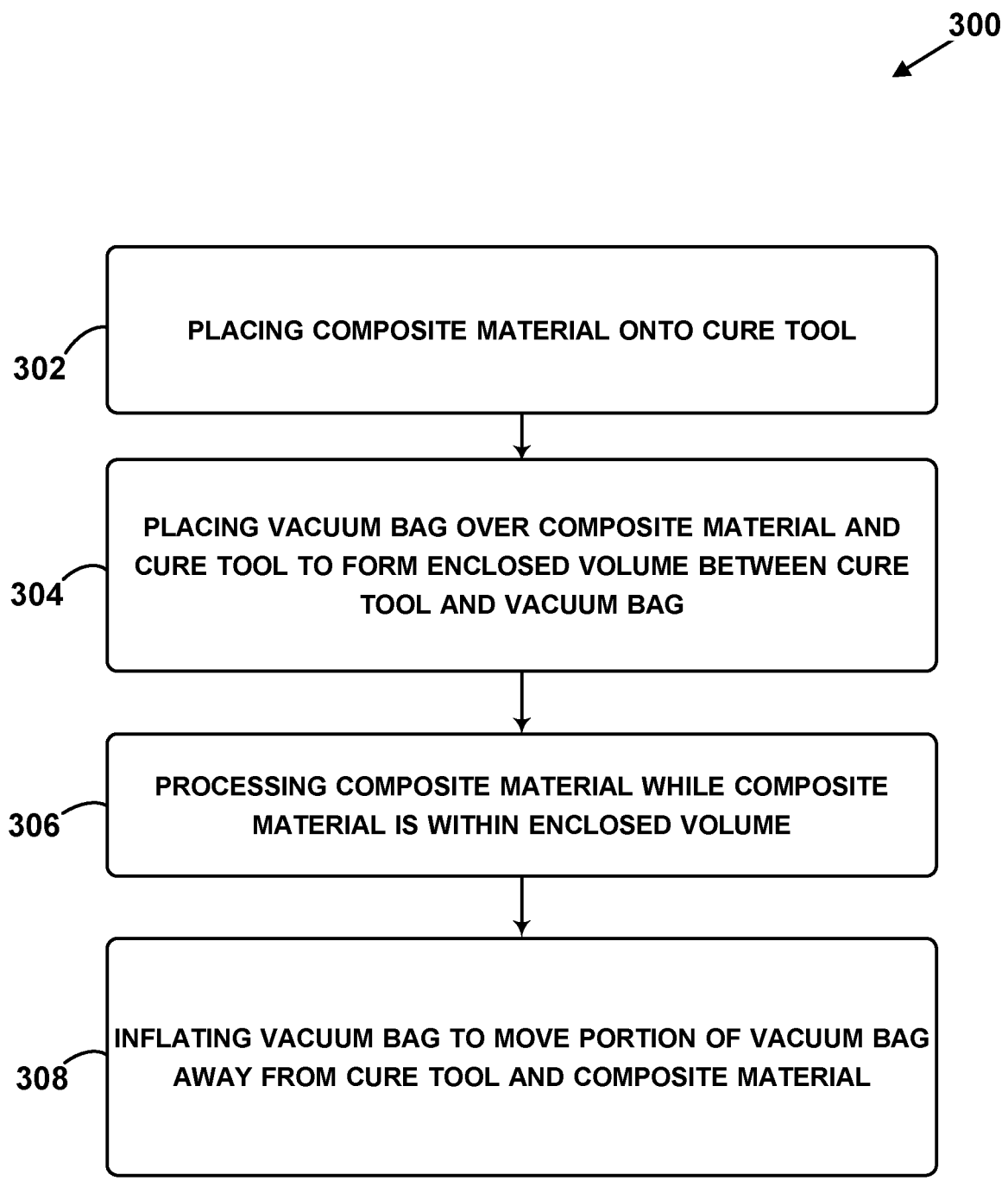
FIG. 2 is a block diagram of a method for processing composite material, according to an example embodiment.

FIG. 2 is a block diagram of a method 300 for processing composite material. The method 300 may be performed with the apparatus 100 and/or the system 200, for example.

Figure 3:
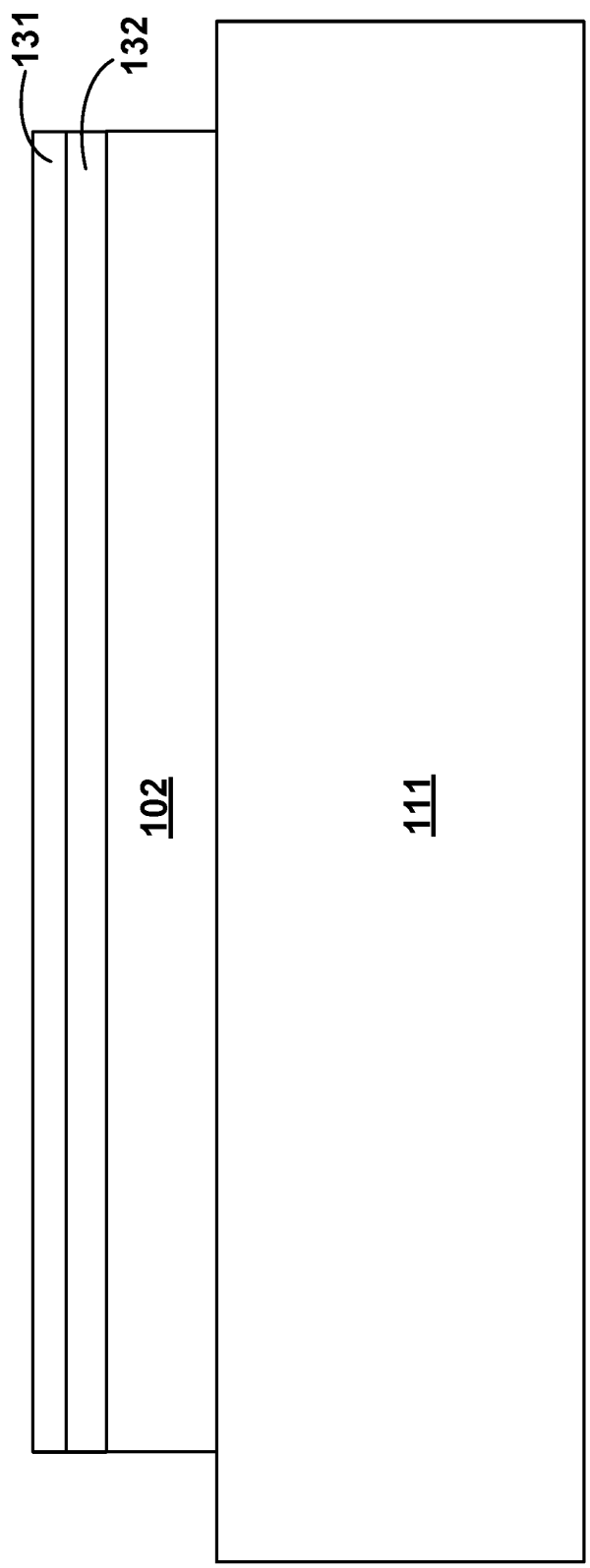
FIG. 3 is a schematic diagram of composite material placed on a cure tool, according to an example embodiment.

At block 302, the method 300 includes placing composite material onto a cure tool. As shown in FIG. 3, a technician may place the composite material 102, the intermediate layer 131, and the intermediate layer 132 onto the cure tool 111.

Figure 4:
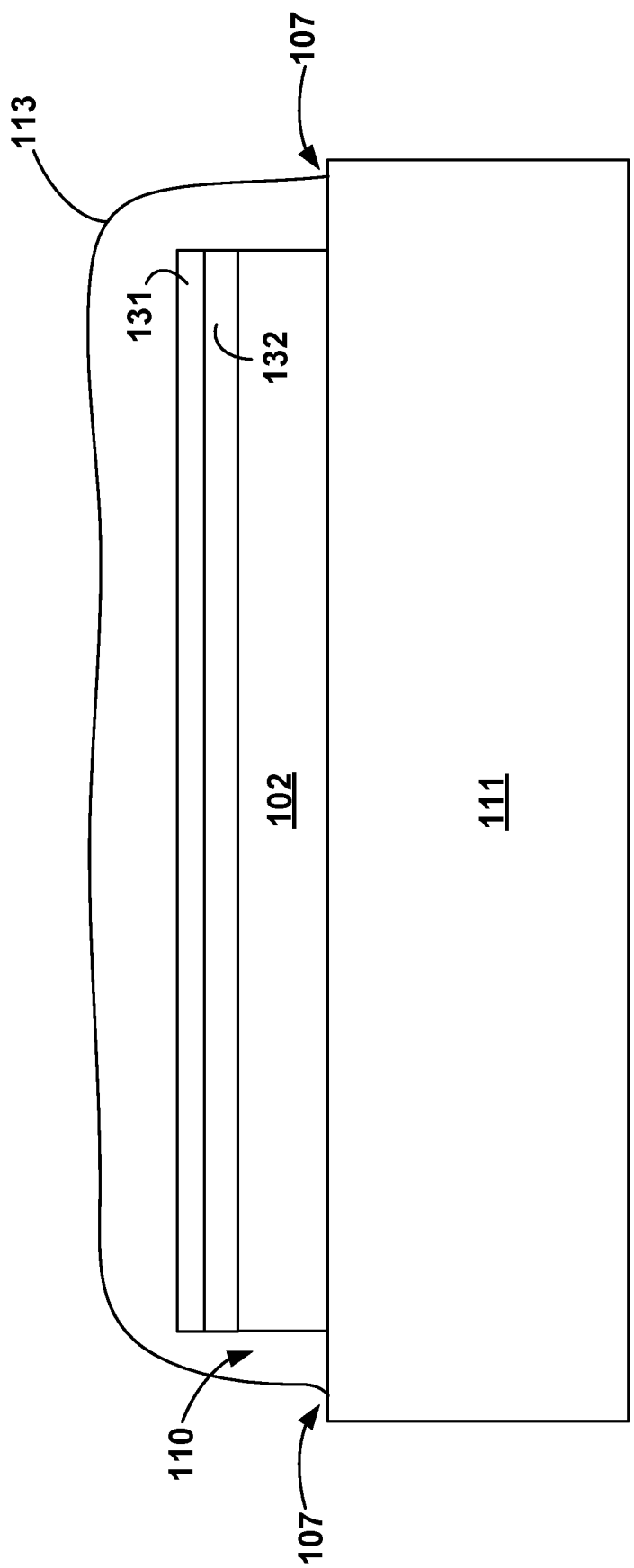
FIG. 4 is a schematic diagram of a vacuum bag placed over composite material and a cure tool, according to an example embodiment.

At block 304, the method 300 includes placing a vacuum bag over the composite material and the cure tool to form an enclosed volume between the cure tool and the vacuum bag. As shown in FIG. 4, the technician may place the vacuum bag 113 over the composite material 102, the intermediate layer 131, the intermediate layer 132, and the cure tool 111 to form the enclosed volume 110. Additionally, the technician may adhere the vacuum bag 113 to the cure tool 111 by applying the sealant tape 107 onto the vacuum bag 113 and the cure tool 111 along an outer edge of the cure tool 111.

Figure 5:
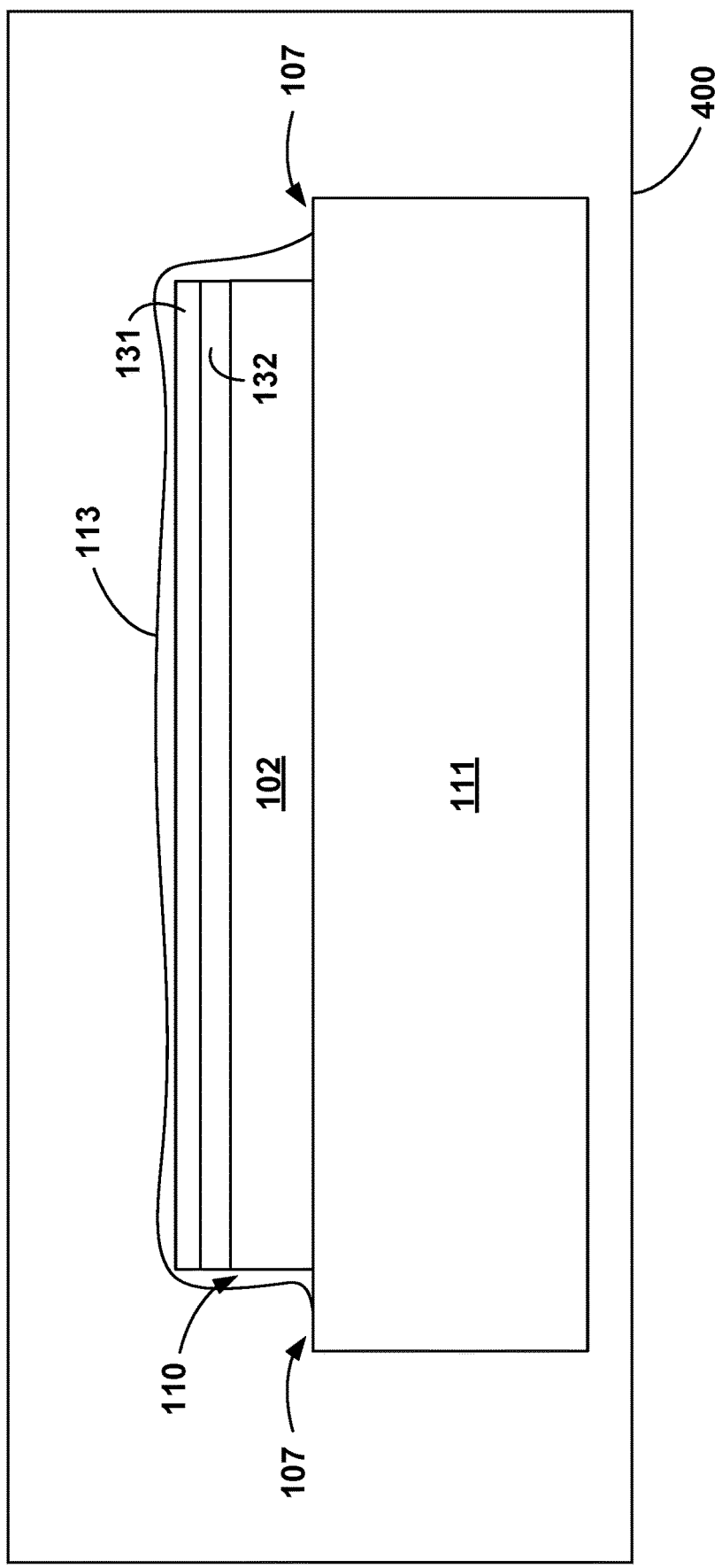
FIG. 5 is a schematic diagram of a cure tool and composite material during processing, according to an example embodiment.

At block 306, the method 300 includes processing the composite material while the composite material is within the enclosed volume. As shown in FIG. 5, the cure tool 111 having the composite material 102 thereupon may be moved into an autoclave 400 for curing and/or other processing. Such processing may include heating the composite material 102 and/or exposing the composite material 102 to air pressure in excess of atmospheric pressure. The composite material 102 generally remains within the enclosed volume 110 during processing or curing. As shown in FIG. 1, the gas 117 (e.g., air) is typically evacuated from the enclosed volume 110 (e.g., by the pump 147) before and/or during processing of the composite material 102.

Figure 6:
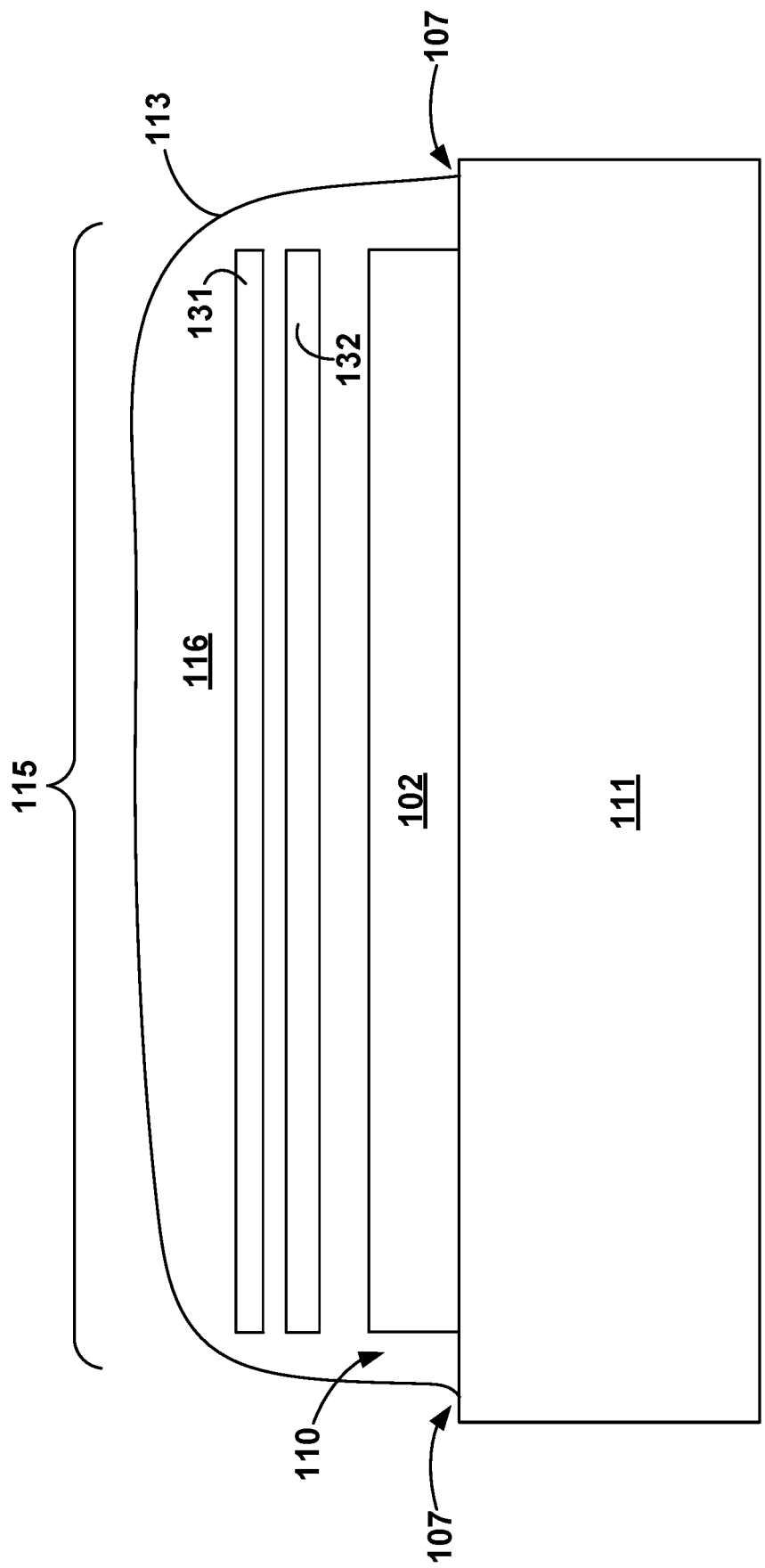
FIG. 6 is a schematic diagram of a cure tool and composite material during or after inflation of a vacuum bag, according to an example embodiment.

At block 308, the method 300 includes inflating the vacuum bag to move a portion of the vacuum bag away from the cure tool and the composite material. Referring to FIG. 1 and FIG. 6, the source 108 of pressurized gas may be used to inflate the vacuum bag 113 to move the portion 115 of the vacuum bag 113 away from the cure tool 111 and away from the composite material 102. The pressure assembly 104 may be used to limit the pressure of the gas used to inflate the vacuum bag 113 to be lower than a predetermined threshold pressure (e.g., 0 to 10 pounds per square inch). Inflation with ionized air provided by the ionizer 112 may cause the intermediate layer 131 and the intermediate layer 132 to separate from each other and the composite material 102, although the distances of separation are exaggerated in FIG.

6 for clarity. Inflating the vacuum bag 113 in this way may aid a technician in maximizing the amount of the vacuum bag 113 that can be recycled.

Figure 7:
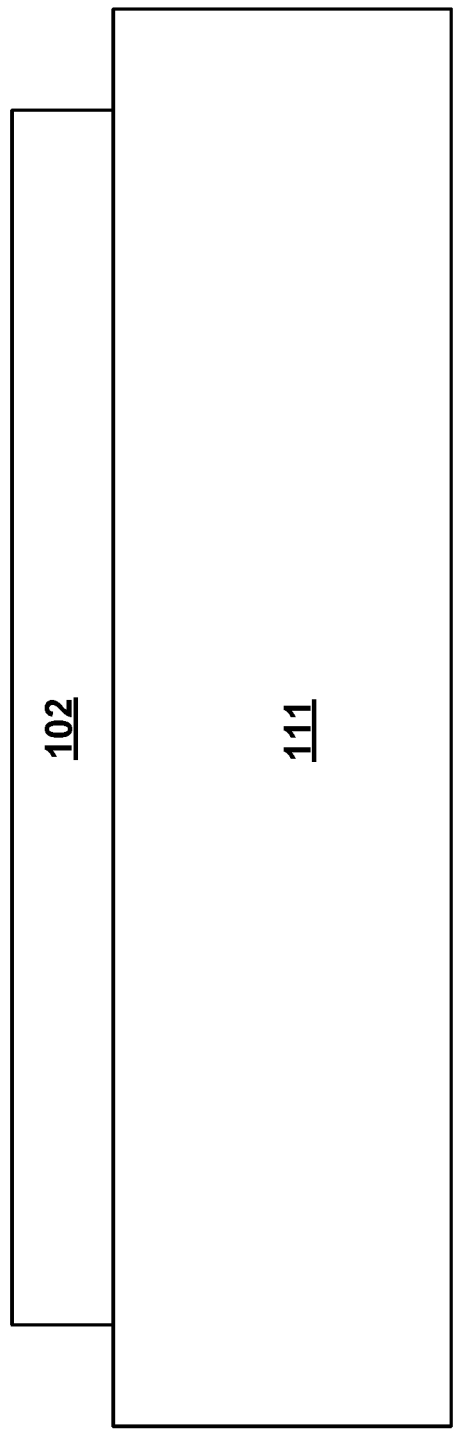
FIG. 7 is a schematic diagram of a cure tool having composite material removed therefrom, according to an example embodiment.

After or during inflation of the vacuum bag 113, the bleed valve 118 may receive the gas 120 from the enclosed volume 110 and release the gas 120. The gas filter 122 may then filter the gas 120 to remove particulates, volatiles, or vapors from the gas 120. After inflation of the vacuum bag 113, a technician may remove at least the portion 115 of the inflated vacuum bag 113, the intermediate layer 131, and/or the intermediate layer 132 from the cure tool 111 and the composite material 102, as shown in FIG. 7.

Embodiments of the present disclosure can thus relate to one of the enumerated example embodiment (EEEs) listed below.

EEE 1 is a system for processing composite material, the system comprising: a cure tool; a source of pressurized gas; a vacuum bag forming an enclosed volume between the cure tool and the vacuum bag; and composite material positioned on the cure tool within the enclosed volume, wherein the source of pressurized gas is configured to inflate the vacuum bag, thereby moving a portion of the vacuum bag away from the cure tool and the composite material.

EEE 2 is the system of EEE 1, wherein the cure tool comprises a contoured surface configured to shape the composite material.

EEE 3 is the system of any of EEEs 1-2, wherein the source of pressurized gas comprises one or more of a pump or a storage tank.

EEE 4 is the system of any of EEEs 1-3, wherein the vacuum bag comprises one or more of plastic, polytetrafluoroethylene, or nylon.

EEE 5 is the system of any of EEEs 1-4, wherein the composite material comprises a carbon-fiber reinforcement and a thermoset matrix.

EEE 6 is the system of any of EEEs 1-5, further comprising a pressure assembly configured to: receive the pressurized gas from the source of pressurized gas, and provide the pressurized gas to the enclosed volume at a gauge pressure within a range of 0 to 10 pounds per square inch (psi).

EEE 7 is the system of any of EEEs 1-6, further comprising an ionizer configured to: receive the pressurized gas from the source of pressurized gas, and provide ionized gas to the enclosed volume.

EEE 8 is the system of any of EEEs 1-7, further comprising a gas filter configured to: receive gas from the enclosed volume, and filter the received gas to remove particulates, volatiles, or vapors from the received gas.

EEE 9 is the system of EEE 8, wherein the gas filter comprises a carbon adsorption filter.

EEE 10 is the system of any of EEEs 1-9, further comprising a bleed valve configured to release gas from the enclosed volume in response to a gas pressure within the enclosed volume exceeding a threshold.

EEE 11 is a method for processing composite material, the method comprising: placing composite material onto a cure tool; placing a vacuum bag over the composite material and the cure tool to form an enclosed volume between the cure tool and the vacuum bag; processing the composite material while the composite material is within the enclosed volume; and inflating the vacuum bag to move a portion of the vacuum bag away from the cure tool and the composite material.

EEE 12 is the method of EEE 11, further comprising evacuating gas from the enclosed volume before processing the composite material.

EEE 13 is the method of any of EEEs 11-12, further comprising removing at least a portion of the inflated vacuum bag from the cure tool and the composite material.

EEE 14 is the method of any of EEEs 11-13, further comprising placing one or more intermediate layers on the composite material before placing the vacuum bag over the composite material, wherein placing the vacuum bag over the composite material comprises placing the vacuum bag over the composite material and the one or more intermediate layers.

EEE 15 is the method of EEE 14, wherein inflating the vacuum bag causes the vacuum bag to separate from the one or more intermediate layers.

EEE 16 is the method of any of EEEs 11-15, wherein inflating the vacuum bag comprises using ionized gas to inflate the vacuum bag.

EEE 17 is the method of EEE 16, wherein using the ionized gas to inflate the vacuum bag causes neutralization of at least some static electricity within the vacuum bag.

EEE 18 is the method of any of EEEs 11-17, further comprising: releasing gas from the enclosed volume after inflating the vacuum bag; and filtering the released gas to remove particulates, volatiles, or vapors from the released gas.

EEE 19 the method of any of EEEs 11-18, wherein inflating the vacuum bag comprises inflating the vacuum bag with gas having a gauge pressure within a range of 0 to 10 pounds per square inch (psi).

EEE 20 is an apparatus for processing composite material, the apparatus comprising: a pressure assembly configured to receive pressurized gas from a source of pressurized gas and provide the pressurized gas, at a predetermined pressure, to an enclosed volume formed between a vacuum bag and a cure tool; an ionizer configured to receive pressurized gas from the source of pressurized gas, ionize the pressurized gas, and provide the ionized gas to the enclosed volume; a bleed valve configured to release gas from the enclosed volume in response to a gas pressure within the enclosed volume exceeding a threshold; and a gas filter configured to receive gas from the enclosed volume and filter the received gas to remove particulates, volatiles, or vapors from the received gas.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A system for processing composite material, the system comprising:
   a cure tool;
   a source of pressurized gas;
   a vacuum bag forming an enclosed volume between the cure tool and the vacuum bag;
   composite material positioned on the cure tool within the enclosed volume; and
   an ionizer configured to receive pressurized gas from the source of pressurized gas and provide ionized gas to the enclosed volume.

2. The system of claim 1, wherein the cure tool comprises a contoured surface configured to shape the composite material.

3. The system of claim 1, wherein the source of pressurized gas comprises one or more of a pump or a storage tank.

4. The system of claim 1, wherein the vacuum bag comprises one or more of plastic, polytetrafluoroethylene, or nylon.

5. The system of claim 1, wherein the composite material comprises a carbon-fiber reinforcement and a thermoset matrix.

6. The system of claim 1, further comprising a pressure assembly configured to:
   receive the pressurized gas from the source of pressurized gas, and
   provide the pressurized gas to the enclosed volume at a gauge pressure within a range of 0 to 10 pounds per square inch (psi).

7. The system of claim 1, further comprising a bleed valve configured to release gas from the enclosed volume in response to a gas pressure within the enclosed volume exceeding a threshold.

8. The system of claim 1, wherein the source of pressurized gas is configured to inflate the vacuum bag, thereby moving a portion of the vacuum bag away from the cure tool and the composite material.

9. A system for processing composite material, the system comprising:
   a cure tool;
   a source of pressurized gas;
   a vacuum bag forming an enclosed volume between the cure tool and the vacuum bag;
   composite material positioned on the cure tool within the enclosed volume; and
   a gas filter configured to receive gas from the enclosed volume and filter the gas to remove particulates, volatiles, or vapors from the gas.

10. The system of claim 9, wherein the gas filter comprises a carbon adsorption filter.

11. The system of claim 9, wherein the source of pressurized gas is configured to inflate the vacuum bag, thereby moving a portion of the vacuum bag away from the cure tool and the composite material.

12. A method for processing composite material, the method comprising:
    placing composite material onto a cure tool;
    placing a vacuum bag over the composite material and the cure tool to form an enclosed volume between the cure tool and the vacuum bag;
    processing the composite material while the composite material is within the enclosed volume;
    receiving pressurized gas from a source of pressurized gas; and
    providing ionized gas to the enclosed volume, thereby inflating the vacuum bag to move a portion of the vacuum bag away from the cure tool and the composite material.

13. The method of claim 12, further comprising evacuating gas from the enclosed volume before processing the composite material.

14. The method of claim 12, further comprising removing at least a portion of the vacuum bag from the cure tool and the composite material after the vacuum bag is inflated.

15. The method of claim 12, further comprising placing one or more intermediate layers on the composite material before placing the vacuum bag over the composite material,
    wherein placing the vacuum bag over the composite material comprises placing the vacuum bag over the composite material and the one or more intermediate layers.

16. The method of claim 15, wherein inflating the vacuum bag causes the vacuum bag to separate from the one or more intermediate layers.

17. The method of claim 12, wherein providing the ionized gas causes neutralization of at least some static electricity within the vacuum bag.

18. The method of claim 12, further comprising:
    releasing gas from the enclosed volume after inflating the vacuum bag; and
    after releasing the gas, filtering the gas to remove particulates, volatiles, or vapors from the gas.

19. The method of claim 12, wherein inflating the vacuum bag comprises inflating the vacuum bag with gas having a gauge pressure within a range of 0 to 10 pounds per square inch (psi).

20. An apparatus for processing composite material, the apparatus comprising:
    a pressure assembly configured to receive pressurized gas from a source of pressurized gas and provide the pressurized gas, at a predetermined pressure, to an enclosed volume formed between a vacuum bag and a cure tool;
    an ionizer configured to receive pressurized gas from the source of pressurized gas, ionize the pressurized gas, and provide the pressurized gas to the enclosed volume after the pressurized gas has been ionized;
    a bleed valve configured to release gas from the enclosed volume in response to a gas pressure within the enclosed volume exceeding a threshold; and
    a gas filter configured to receive gas from the enclosed volume and filter the gas to remove particulates, volatiles, or vapors from the gas.

* * * * *